(12) United States Patent
Moisin

(10) Patent No.: US 6,194,843 B1
(45) Date of Patent: Feb. 27, 2001

(54) HID BALLAST WITH HOT RESTART CIRCUIT

(75) Inventor: Mihail S. Moisin, Brookline, MA (US)

(73) Assignee: Electro-Mag International, Inc., North Scituate, MA (US)

( * ) Notice: Subject to any disclaimer, the term of this patent is extended or adjusted under 35 U.S.C. 154(b) by 0 days.

(21) Appl. No.: 09/240,226

(22) Filed: Jan. 29, 1999

(51) Int. Cl.$^7$ .................................................. H05B 37/02
(52) U.S. Cl. .................................. 315/225; 315/209 CD; 315/DIG. 7; 315/224
(58) Field of Search .................................... 315/307, 224, 315/287, DIG. 5, DIG. 7, DIG. 2, 225, 291, 219, 209 R, 243, 209 CD, 209 M, 209 SC

(56) References Cited

U.S. PATENT DOCUMENTS

| | | | |
|---|---|---|---|
| 3,732,460 | 5/1973 | Wattenbach | 315/123 |
| 3,989,976 | 11/1976 | Tabor | 315/291 |
| 4,103,209 | 7/1978 | Elms | 315/207 |
| 4,107,579 | 8/1978 | Bodine, Jr. et al. | 315/205 |
| 4,204,141 | 5/1980 | Nuver | 315/311 |
| 4,287,454 | 9/1981 | Feuersanger et al. | 315/178 |
| 4,331,905 | 5/1982 | Owen | 315/225 |
| 4,339,692 | 7/1982 | Lasecki et al. | 315/277 |
| 4,350,935 | 9/1982 | Spira et al. | 315/291 |
| 4,356,433 | 10/1982 | Linden | 315/308 |
| 4,373,146 | 2/1983 | Bonazoli et al. | 315/209 R |
| 4,378,514 | 3/1983 | Collins | 315/276 |
| 4,414,493 | 11/1983 | Henrich | 315/308 |
| 4,437,043 | 3/1984 | Pitel | 315/308 |
| 4,455,510 | 6/1984 | Lesko | 315/263 |
| 4,503,364 | 3/1985 | Engel | 315/308 |
| 4,745,341 | 5/1988 | Herres | 315/176 |
| 4,763,044 | 8/1988 | Nuckolls et al. | 315/176 |
| 4,810,936 | 3/1989 | Nuckolls et al. | 315/119 |
| 4,890,041 | 12/1989 | Nuckolls et al. | 315/225 |
| 4,904,903 | 2/1990 | Pacholok | 315/209 R |
| 4,958,107 | 9/1990 | Mattas et al. | 315/289 |
| 4,959,593 | 9/1990 | Joanino | 315/290 |
| 5,003,231 | 3/1991 | Perper | 315/291 |
| 5,023,521 | * 6/1991 | Sridharan | 315/290 |
| 5,036,256 | 7/1991 | Garrison et al. | 315/308 |
| 5,047,694 | * 9/1991 | Nuckolls et al. | 315/290 |
| 5,051,665 | 9/1991 | Garrison et al. | 315/287 |
| 5,084,801 | 1/1992 | El-Hamamsy et al. | 361/277 |
| 5,118,994 | 6/1992 | Byszewski et al. | 315/240 |
| 5,134,345 | 7/1992 | El-Hamamsy et al. | 315/248 |

(List continued on next page.)

FOREIGN PATENT DOCUMENTS

| | | | | |
|---|---|---|---|---|
| 39 23 699 A1 | 3/1990 | (DE) | | H05B/41/23 |
| 40 15 400 A1 | 11/1991 | (DE) | | H05B/41/29 |
| 0 337 021 A1 | 10/1989 | (EP) | | H05B/41/04 |
| 0 411 617 A2 | 2/1991 | (EP) | | H05B/41/29 |
| 2 319 677 | 5/1998 | (GB) | | H05B/41/29 |

OTHER PUBLICATIONS

International Search Report Mailed May 25, 2000.

Primary Examiner—Don Wong
Assistant Examiner—Ephrem Alemu
(74) Attorney, Agent, or Firm—Nutter, McClennen & Fish, LLP

(57) ABSTRACT

A ballast includes a hot restart circuit for hot restart of a HID lamp. In one embodiment, the hot restart circuit includes inductively coupled first and second inductive elements coupled end to end. A first capacitor has a first terminal coupled to a point between the first and second inductive elements and a second terminal coupled to a switching element. When the switching element transitions to a conductive state, a voltage pulse is generated on the second inductive element and the corresponding pulse on the first inductive element is sufficient to achieve hot restart of the lamp. In one embodiment, the first capacitor and the second inductive provide a parallel resonant LC circuit. The resultant signal on the second inductive element increases a voltage on the first inductive element for hot restart of the lamp.

23 Claims, 2 Drawing Sheets

U.S. PATENT DOCUMENTS

| | | | |
|---|---|---|---|
| 5,138,231 | 8/1992 | Iida et al. | 315/73 |
| 5,225,742 | 7/1993 | Beasley | 315/307 |
| 5,321,338 * | 6/1994 | Nuckolls et al. | 315/290 |
| 5,339,005 | 8/1994 | Byszewski et al. | 315/244 |
| 5,387,849 * | 2/1995 | Sridharan | 315/247 |
| 5,391,966 | 2/1995 | Garrison | 315/308 |
| 5,424,617 | 6/1995 | Garbowicz et al. | 315/289 |
| 5,428,268 | 6/1995 | Melis et al. | 315/247 |
| 5,444,334 | 8/1995 | Speaker et al. | 315/209 CD |
| 5,449,980 * | 9/1995 | Kiefer et al. | 315/240 |
| 5,569,984 | 10/1996 | Holtslag | 315/307 |
| 5,572,093 | 11/1996 | Kiefer | 315/289 |
| 5,594,308 | 1/1997 | Nuckolls et al. | 315/290 |
| 5,606,222 | 2/1997 | Cottaar et al. | 315/58 |
| 5,623,187 | 4/1997 | Caldeira et al. | 315/307 |
| 5,677,602 * | 10/1997 | Paul et al. | 315/224 |
| 5,684,367 | 11/1997 | Moskowitz et al. | 315/246 |
| 5,723,951 | 3/1998 | Byszewski et al. | 315/174 |
| 5,925,986 | 7/1999 | Moisin | 315/247 |
| 5,962,981 * | 10/1999 | Okude et al. | 315/128 |

* cited by examiner

HID BALLAST WITH HOT RESTART CIRCUIT

CROSS REFERENCE TO RELATED APPLICATION

Not Applicable.

STATEMENT REGARDING FEDERALLY SPONSORED RESEARCH

Not Applicable.

FIELD OF THE INVENTION

The present invention relates to ballast circuits and more particularly to ballast circuits for energizing high intensity discharge lamps.

BACKGROUND OF THE INVENTION

High intensity discharge (HID) lamps are typically coupled to an electronic ballast which provides an alternating current (AC) signal to the lamps. To initially ignite the lamps, i.e. cold start, the ballast must apply a relatively high voltage, 2 kilovolts for example, which initiates an electric arc between the lamp terminals. After ignition of the lamp, the ballast provides operational signal levels for sustaining the electrical arc which is the source for light emitted by the lamp. To re-ignite a lamp immediately after the arc is extinguished, a hot start voltage, e.g., 10–25 kV, is required which is significantly higher than for cold start of the lamp.

The challenges of achieving hot restart of HID lamps are well known to one of ordinary skill in the art. In general, when the electric arc between the lamp terminals is extinguished the gas within the lamp de-ionizes such that a relatively high restart voltage is required to breakdown the electrical field of the hot gas and re-initiate a light generating arc. Some ballasts utilize a spark gap device to provide voltage levels sufficient to enable hot restart of the lamp. Other ballasts include complex and expensive circuitry to generate the relatively high voltage and current levels needed for hot restart of the lamp. However, such ballasts are often unreliable and may degrade the lamp operating characteristics.

It would, therefore, be desirable to provide a ballast having an efficient and elegant circuit for hot restart of a HID lamp.

SUMMARY OF THE INVENTION

The present invention provides a ballast that includes a circuit for hot restart of a HID lamp. Although the invention is primarily shown and described in conjunction with ballasts for energizing a HID lamp, it is understood that the invention has other applications such as fluorescent lamps, as well as voltage regulators and motors.

In one embodiment, a ballast in accordance with the present invention includes a rectifier and an inverter having a hot restart circuit for providing hot restart of a HID lamp. In one particular embodiment, the inverter includes first and second switching elements coupled in a half bridge configuration. A first control circuit controls the conduction state of the first switching element and a second control circuit controls the conduction state of the second switching element. A resonant circuit including a resonant inductive element and a resonant capacitor is coupled to the switching elements and the lamp for providing an AC signal to the HID lamp.

The hot restart circuit is coupled to the lamp and to the resonant capacitor. In an exemplary embodiment, the hot restart circuit includes inductively coupled first and second inductive elements. A first capacitor is coupled to the second inductive element and a switching element is coupled to the first capacitor. In one particular embodiment, a circuit loop includes the first capacitor, the switching element and the second inductive element. When the switching element transitions to a conductive state, a voltage pulse is generated at the second inductive element. The corresponding signal on the inductively coupled first inductive element is effective to provide hot restart of the lamp.

In one embodiment, the transition of the switching element to a conductive state results in the first capacitor and the second inductive element forming a parallel resonant LC circuit. The resonant signal increases the voltage generated at the second inductive element which concomitantly generates an increased voltage signal on the first inductive element. The resonant nature of the circuit thereby increases signal levels applied to the lamp for enhancing the hot restart capability of the ballast

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
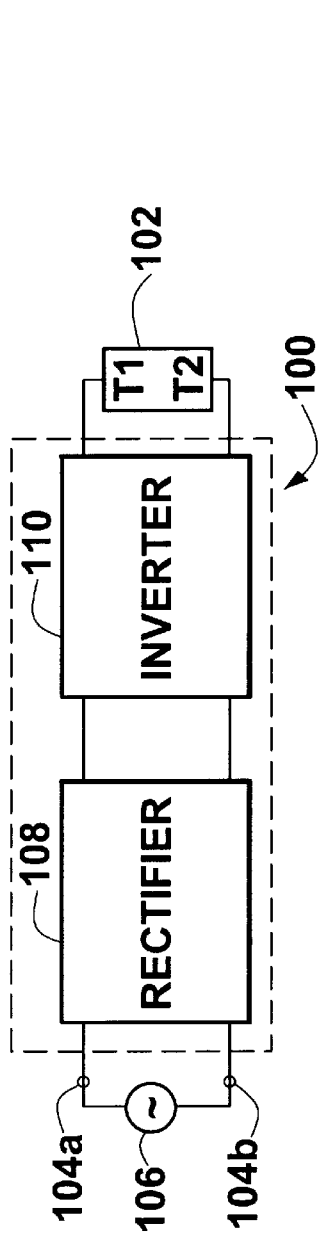
FIG. 1 is a schematic block diagram of a ballast circuit in accordance with the present invention.

FIG. 1 shows a ballast circuit 100 for energizing a high intensity discharge (HID) lamp 102. The ballast 100 includes first and second input terminals 104a,b coupled to an AC energy source 106. The ballast circuit 100 receives a relatively low frequency signal from the AC energy source 106 and provides a relatively high frequency signal to the lamp 102 for generating an electric arc across the lamp terminals thereby causing the lamp to emit visible light. As described below, the ballast 100 provides signal levels which are capable of hot restarting a HID lamp after the arc has been extinguished.

The ballast 100 includes a rectifier 108 for receiving the relatively low frequency signal from the AC energy source 106 and providing a DC signal to an inverter circuit 110. The inverter 110 is effective to energize the lamp 102 with a high frequency signal that generates a sufficiently high voltage to initiate and sustain an electric arc between the lamp terminals T1,T2.

Figure 2:
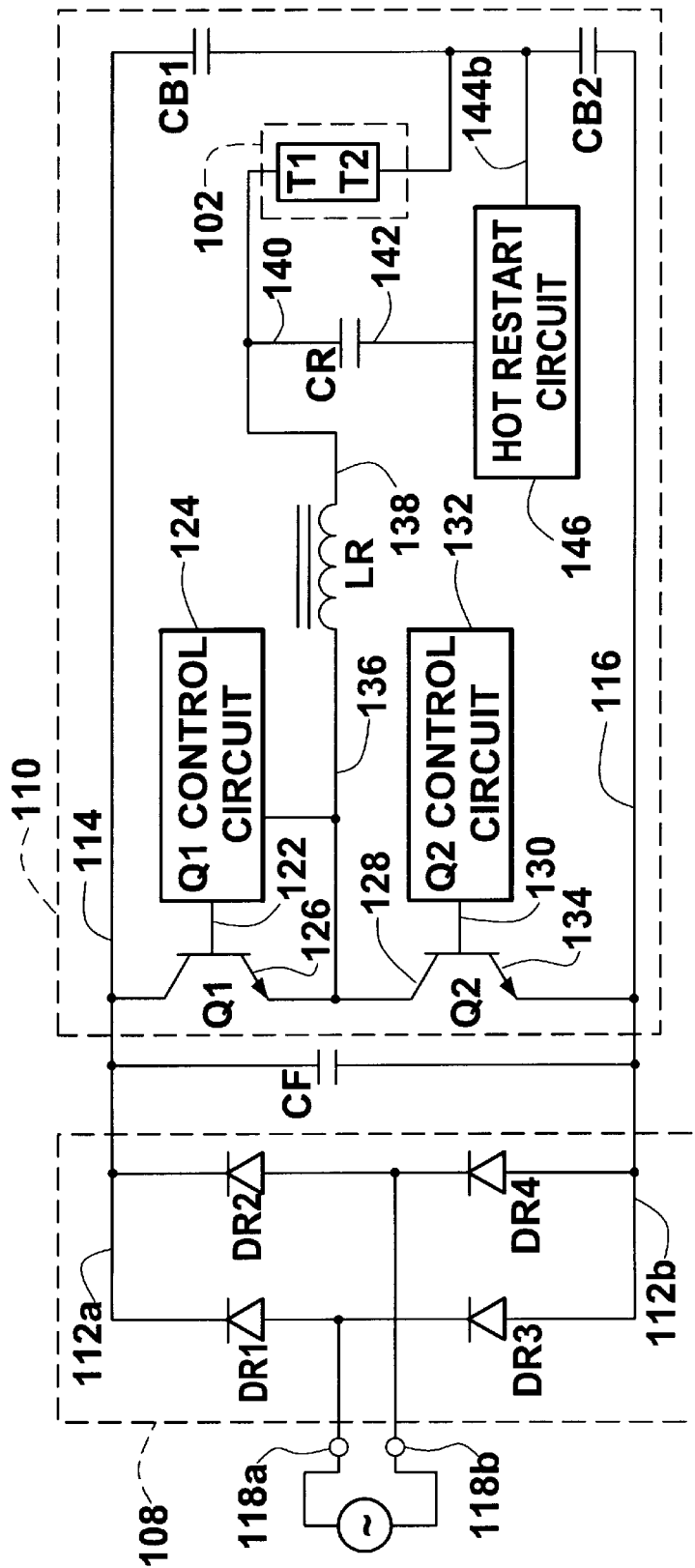
FIG. 2 is a circuit diagram of an exemplary implementation of the circuit of FIG. 1.

FIG. 2 shows an exemplary embodiment of the ballast 100 of FIG. 1. The rectifier 108 is a full bridge rectifier formed from first, second, third, and fourth rectifying diodes DR1–4. The first and third diodes DR1,DR3 are coupled end to end between first and second DC output terminals 112a,b of the rectifier which correspond to positive and negative rails 114,116 of the inverter 110. The second and fourth diodes DR2,DR4 are also coupled end to end between the output terminals 112a,b of the rectifier. The AC energy source 106 has a first terminal 118a coupled to a point between the first and third diodes DR1,DR3 and a second terminal 118b coupled to a point between the second and fourth diodes DR2,DR4. A filter capacitor CF can be coupled between the rectifier output terminals 112a,b. The rectifier is effective to provide respective DC signals for energizing the positive and negative rails 114,116 of the inverter 110.

The inverter 110 is shown as a resonant inverter having first and second switching elements Q1,Q2 coupled in a half bridge configuration. The first-switching element Q1, shown here as a transistor, has a first or collector terminal 120 coupled to the positive rail 114 of the inverter, a second or base terminal 122 coupled to a first control circuit 124 for controlling the conduction state of the first switching element, and a third or emitter terminal 126 coupled to a first or collector terminal 128 of the second switching element Q2. The second switching element Q2 has a second or base terminal 130 coupled to a second control circuit 132 for controlling the conduction state of the second switching element Q2 and a third or emitter terminal 134 coupled to the negative rail 116 of the inverter.

A resonant inductive element LR has a first terminal 136 coupled to a point between the first and second switching elements Q1,Q2 and a second terminal 138 coupled to a first terminal 140 of a resonant capacitor CR to which the first terminal T1 of the lamp 102 is also coupled. A second terminal 142 of the resonant capacitor CR is coupled to a first terminal 144 of a hot restart circuit 146. A second terminal 144b of the hot restart circuit 146 is connected to a point between first and second bridge capacitors CB1,CB2 which are coupled end to end between the positive and negative rails 114,116 of the inverter.

Figure 3:
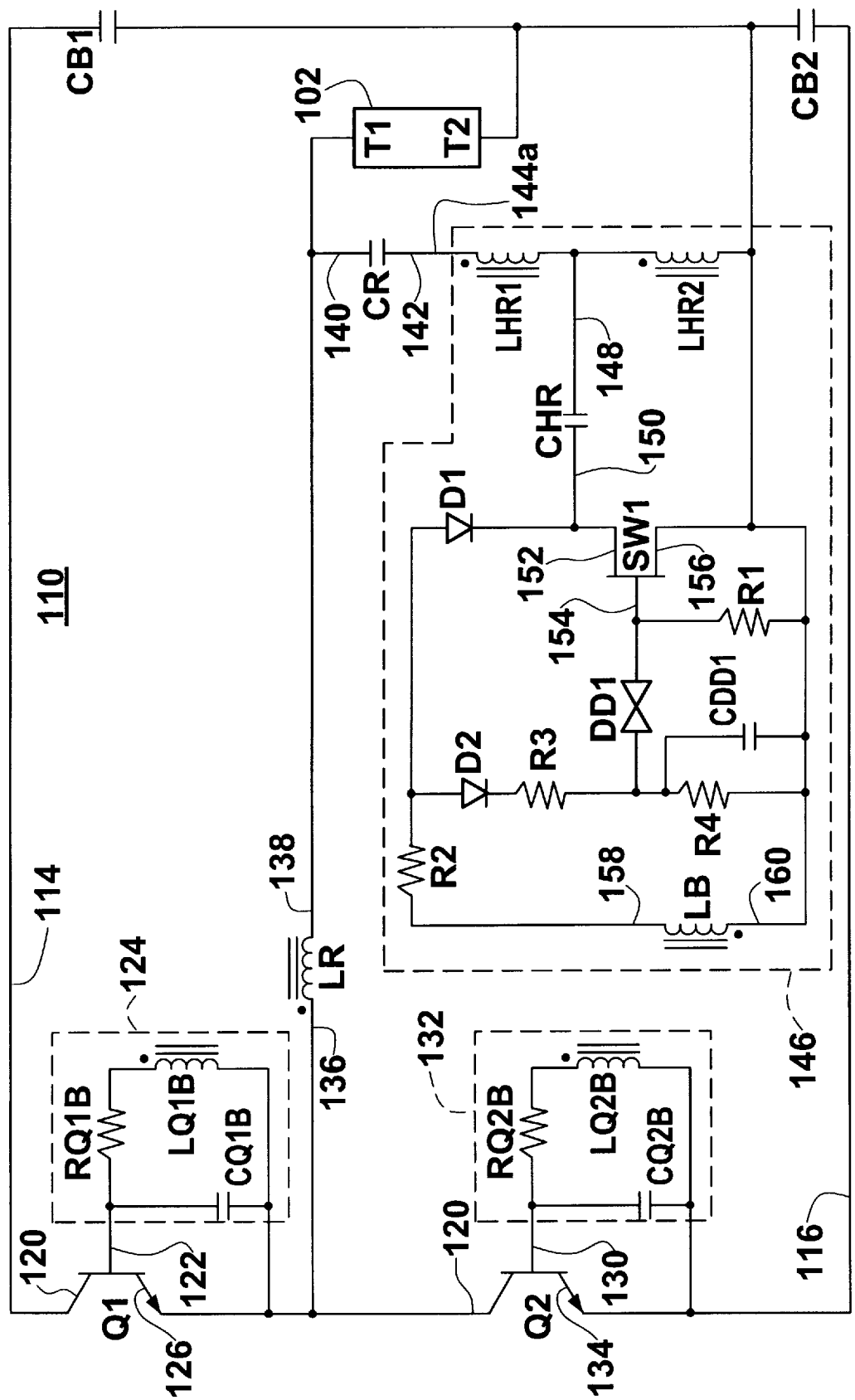
FIG. 3 is a circuit diagram showing further details of the circuit of FIG. 2.

FIG. 3 shows an exemplary circuit embodiment of the hot restart circuit 146, as well as the first and second control circuits 124,132. The first control circuit 124 includes a capacitor CQ1B coupled across the base and emitter terminals 122,126 of the first switching element Q1 and a resistor RQ1B coupled in series to an inductive element LQ1B across the capacitor CQ1B. The inductive element LQ1B is inductively coupled to the resonant inductive element LR with a polarity indicated with conventional dot notation. The second control circuit 132 includes corresponding circuit elements CQ2B, RQ2B,LQ2B. As known to one of ordinary skill in the art, the inductive elements LQ1B,LQ2B are effective to alternately bias a respective switching element to conductive and non-conductive states to achieve resonant operation of the inverter and thereby provide an AC signal to the lamp 102. In general, the first switching element Q1 is conductive as current flows from the resonant inductive element LR to the lamp 102 and the second switching element Q2 is conductive as current flows in the opposite direction from the lamp 102 to the resonant inductive element LR.

The hot restart circuit 146 includes first and second hot restart inductive elements LHR1,LHR2,which are inductively coupled to each other. The respective polarities of the inductive elements LHR1,LHR2 correspond to conventional dot notation as shown. The first and second hot restart inductive elements LHR1,LHR2 are coupled end to end between the resonant capacitor CR and the second terminal T2 of the lamp 102. A hot restart capacitor CHR has a first terminal 148 coupled to a point between the first and second hot restart inductors LHR1,LHR2 and a second terminal 150 coupled to a first terminal 152 of a threshold switching element SW1, shown here as a silicon-controlled rectifier (SCR). It is understood, however, that other types of switching elements known to one of ordinary skill in the art can be used. The threshold switching element SW1 has a second terminal 154 coupled to a diac DD1 and a third terminal 156 coupled to the 144B of the second hot restart inductive element LHR2. A current limiting resistor R1 is coupled across the second and third terminals 154,156 of the threshold switching element SW1.

The hot restart circuit 146 further includes an inductive bias element LB which is inductively coupled to the resonant inductive element LR (and/or LQ2B) with a polarity as shown with conventional dot notation. A first terminal 158 of the bias element LB is coupled to the first terminal 152 of the threshold switching element SW1 via a second resistor R2 and a first diode D1, and a second terminal 160 is coupled to the third terminal 156 of the switching element SW1. A second diode D2, a third resistor R3, and a fourth resistor R4 complete a circuit loop which includes the second resistor R2. and the bias element LB. A diac capacitor CDD1 is coupled in parallel with the fourth resistor R4 between the diac DD1 and the second terminal 160 of the bias element LB.

The hot restart circuit 146 provides a voltage to the lamp 102 that is sufficient to re-ignite the lamp after the arc has been extinguished, i.e., hot restart. As the signal levels in the inverter increase due to the resonant nature of the circuit, the signal at the bias element LB, which is inductively coupled to the resonant inductive element LR, increases. The second diode D2 rectifies the bias element LB signal so as to charge the diac capacitor CDD1. The signal present on the bias element LB is also rectified by the first diode so as to generate a voltage on the hot restart capacitor CHR.

When the voltage present on the diac capacitor CDD1 is sufficient to cause the diac DD1 to become conductive, the threshold switching element SW1 transitions to a conductive state. As the threshold switching element SW1 becomes conductive, a voltage pulse derived from energy stored in the circuit elements, e.g., CHR,LHR2, is generated on the second hot restart inductor LHR2 which induces a corresponding pulse on the first hot restart inductive element LHR1. The resultant signal on the first hot restart inductive element LHR1 is applied to the lamp 102 for hot restart of the lamp.

In an exemplary embodiment, the circuit can include a resonant feature to enhance the properties of the signal or pulse applied to the lamp. While the threshold switching element SW1 is conductive, the hot restart capacitor CHR and the second hot restart inductive element are arranged in parallel inductive-capacitive (LC) resonant circuit. As known to one or ordinary skill in the art, a parallel resonant LC circuit appears to the circuit as an open circuit at a characteristic resonant frequency, i.e., a notch filter. It is understood that the resonant frequency of the parallel LC circuit can vary. In an exemplary embodiment, the characteristic resonant frequency is about 100 kiloHertz. And while current at or near the resonant frequency does not flow through the parallel LC circuit, significant amounts of current flow between the hot restart capacitor CHR and the second hot restart inductive element LHR2 due to the phase difference between the current flowing through the inductive and capacitive elements.

The flow of current through the second hot restart inductive element LHR2 induces a corresponding voltage in the first hot restart inductive element LHR1. In an exemplary embodiment, the turns ratio of the first hot restart inductive element LHR1 to the second hot restart inductive element HLR2 is about 30. It is understood by one of ordinary skill in the art that the turns ratio can vary widely to achieve a desired voltage level at the inductors. Thus, for a turn ratio of about thirty, a voltage of about 500 volts on the second hot restart inductive element LHR2 generates a voltage of about 15,000 volts on the first hot restart inductive element LHR1. This voltage is applied to the lamp 102 for achieving hot restart of the HID lamp, i.e., re-igniting an arc between the lamp terminals T1,T2.

It will be appreciated that values for the circuit components can vary. One of ordinary skill in the art can readily modify exemplary component values. Accordingly, the exemplary component values provided in the table below demonstrate but one particular circuit embodiment.

| Component | Value |
|---|---|
| CR | 0.0047 $\mu$F |
| CHR | 0.001 $\mu$F |
| CDD1 | 0.1 $\mu$F |
| R1 | 10 k$\Omega$ |
| R2 | 100 $\Omega$ |
| R3 | 100 $\Omega$ |
| R4 | 1 k$\Omega$ |
| LR | 1 mH |
| LHR1 | 100 T |
| LHR2 | 3000 T |
| DD1 | 10 V threshold |

One of ordinary skill in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A ballast circuit for energizing a HID lamp, comprising:
   an inverter circuit having two switching elements for providing an AC drive signal to the lamp;
   a resonant inductive element coupled between said switching elements and the lamp; and
   a hot restart circuit coupled to the lamp when the lamp is connected in circuit for applying a voltage to the lamp that is sufficient to achieve hot restart of the lamp, the hot restart circuit including:
      a first inductor coupled to the lamp;
      a second inductor inductively coupled to the first inductor, said second inductor having first and second ends, said first end being directly connected to the lamp and said second end being connected to an end of the first inductor at a junction;
      a first capacitor coupled to the second inductor at said junction; and
      a first switching element coupled to the first capacitor, said first switching element, said first capacitor, and said second inductor selectively forming a circuit loop such that a transition of the first switching element to a first state generates a voltage pulse on the second inductor which induces a corresponding voltage pulse on the first inductor for hot restart of the lamp.

2. The ballast circuit according to claim 1, wherein a resonance between the first capacitor and the second inductor increases the voltage applied to the first lamp.

3. The ballast circuit according to claim 2, wherein the resonance is a parallel LC resonance between the first capacitor and the second inductor.

4. The ballast circuit according to claim 1, wherein the first switching element has first, second and third terminals, the first terminal being coupled to the first capacitor and the third terminal being coupled to the second inductor.

5. The ballast circuit according to claim 1, wherein a first circuit loop includes the second inductor, the first capacitor and the first switching element.

6. A ballast circuit for energizing a HID lamp, comprising:
   an inverter circuit having two switching elements for providing an AC drive signal to the lamp;
   a resonant inductive element coupled between said switching elements and the lamp;
   a hot restart circuit coupled to the lamp when the lamp is connected in circuit for applying a voltage to the lamp that is sufficient to achieve hot restart of the lamp, the hot circuit including:
      a first inductor coupled to the lamp;
      a second inductor coupled to the first inductor the first and second inductors being inductively coupled;
      a first capacitor coupled to the second inductor;
      a first switching element having first, second and third terminals said first switching element being coupled to the first capacitor such that a transition of the first switching element to a first state generates a voltage pulse on the second inductor which induces a corresponding voltage pulse on the first inductor for hot restart of the lamp; and
      a diac coupled to the second terminal of the first switching element;
      wherein a first circuit loop includes the second inductor, the first capacitor and the first switching element.

7. The ballast circuit according to claim 6, further including a diac capacitor coupled to the diac which biases the diac to a conductive state when a voltage on the diac capacitor is greater than a predetermined level.

8. A ballast circuit for energizing a HID lamp,
   a hot restart circuit coupled to the lamp when the lamp is connected in circuit for applying a voltage to the lamp that is sufficient to achieve hot restart of the lamp, the hot restart circuit including:
      a first inductor coupled to the lamp;
      a second inductor coupled to the first inductor, the first and second inductors being inductively coupled;
      a first capacitor coupled to the second inductor;
      a first switching element coupled to the first capacitor, such that a transition of the first switching element to a first state generates a voltage pulse on the second inductor which induces a corresponding signal pulse on the first inductor for hot restart of the lamp,
      a diac coupled to the second terminal of the first switching element,
      a diac capacitor coupled to the diac which biases the diac to a conductive state when a voltage on the diac capacitor is greater than a predetermined level, and
      an inductive bias element and a diac diode coupled to the diac capacitor for rectifying a signal on the bias element and charging the diac capacitor,
   wherein a first circuit loop includes the second inductor, the first capacitor and the first switching element.

9. The ballast circuit according to claim 8, wherein the bias element is inductively coupled to a resonant inductive element which forms a portion of a resonant circuit for providing an AC signal to the lamp.

10. A ballast circuit for energizing a HID lamp, comprising:
    an inverter circuit having two switching elements for providing an AC drive signal to the lamp;
    a resonant inductive element coupled between said switching elements and the lamp;

a hot restart circuit coupled to the lamp when the lamp is connected in circuit for applying a voltage to the lamp that is sufficient to achieve hot restart of the lamp, the hot restart circuit including:
a first inductor coupled to the lamp;
a second inductor coupled to the first inductor the first and second inductors being inductively coupled;
a first capacitor coupled to the second inductor;
a first switching element coupled to the first capacitor such that a transition of the first switching element to a first state generates a voltage pulse on the second inductor which induces a corresponding voltage pulse on the first inductor for hot restart of the lamp;
an inductive bias element inductively coupled to said resonant inductive element and coupled to the first capacitor, and
a first diode coupled to the first capacitor for rectifying a signal on the bias element and charging the first capacitor.

11. A ballast circuit for energizing a HID lamp, comprising:
a hot restart circuit coupled to the lamp when the lamp is connected in circuit for applying a voltage to the lamp that is sufficient to achieve hot restart of the lamp, the hot restart circuit including:
a first inductor coupled to the lamp;
a second inductor coupled to the first inductor the first and second inductors being inductively coupled;
a first capacitor coupled to the second inductor;
a first diode and an inductive bias element coupled to the first capacitor for rectifying a signal on the bias element and charging the first capacitor, the bias element being inductively coupled to a resonant inductive element which forms a portion of a resonant circuit for providing an AC signal to the lamp, and
a first switching element coupled to the first capacitor such that a transition of the first switching element to a first state generates a voltage pulse on the second inductor which induces a corresponding signal pulse on the first inductor for hot restart of the lamp.

12. A ballast circuit for energizing a HID lamp, comprising
a hot restart circuit coupled to the lamp when the lamp is connected in circuit for applying a voltage to the lamp that is sufficient to achieve hot restart of the lamp, the hot restart circuit including:
a first inductor having first and second ends, said first end being coupled to the lamp;
a second inductor inductively coupled to the first inductor, said second inductor having first and second ends, the first end of the second inductor being connected at a junction to the second end of the first inductor and the second end of the second inductor being directly connected to the lamp;
a first capacitor coupled to the second inductor; and
a first switching element coupled to the first capacitor, such that a transition of the first switching element to a first state generates a voltage pulse on the second inductor which induces a corresponding voltage pulse on the first inductor for hot restart of the lamp.

13. The ballast circuit according to claim 12, further including a resonant capacitor which forms a portion of a resonant circuit for providing an AC signal to the lamp, wherein the resonant capacitor is coupled to the first inductive element.

14. A ballast circuit for energizing a HID lamp, comprising:
a first inductor having first and second ends, said first end being coupled to the lamp;
a second inductor inductively coupled to the first inductor, said second inductors having first and second ends, the first end of the second inductor being coupled to the second end of the first inductor;
a resonant capacitor which forms a portion of a resonant circuit for providing an AC signal to the lamp, the resonant capacitor being coupled to the first inductive element;
a first capacitor coupled to the second inductor; and
a first switching element coupled to the first capacitor such that a transition of the first switching element to a first state generates a voltage pulse on the second inductor which induces a corresponding voltage pulse on the first inductor for hot restart of the lamp,
wherein a first circuit loop includes the resonant capacitor the first and second inductors and the lamp.

15. A ballast circuit for energizing a HID lamp, comprising:
a rectifier circuit for receiving a AC input signal and outputting a DC output signal;
an inverter circuit coupled to the rectifier circuit for receiving the DC output signal and providing an AC drive signal to the lamp, the inverter circuit including a resonant circuit having a resonant inductive element and a resonant capacitive element; and
a hot restart circuit including
inductively coupled first and second hot restart inductive elements coupled so as to form a series circuit path, the first hot restart inductive element being coupled to the resonant capacitive element;
a hot restart capacitor having a first terminal coupled to a point between the first and second hot restart inductive elements and a second terminal; and
a threshold switching element having first, second and third terminals, the first terminal being coupled to the second terminal of the hot restart capacitor, and the third terminal being coupled to the second hot restart inductive element such that the hot restart capacitor, the threshold switching element and the second hot restart inductive element form a first circuit loop, said threshold switching element having an inductive bias element inductively coupled to said resonant inductive element.

16. The ballast circuit according to claim 15, wherein the hot restart circuit further includes a diac coupled to the second terminal of the threshold switching element.

17. A ballast circuit for energizing a HID lamp, comprising:
a rectifier circuit for receiving an AC input signal and outputting a DC output signal;
an inverter circuit coupled to the rectifier circuit for receiving the DC output signal and providing an AC drive signal to the lamp, the inverter circuit including a resonant circuit having a resonant inductive element and a resonant capacitive element; and
a hot restart circuit including
inductively coupled first and second hot restart inductive elements coupled so as to form a series circuit path, the first hot restart inductive element being coupled to the resonant capacitive element;
a hot restart capacitor having a first terminal coupled to a point between the first and second hot restart inductive elements and a second terminal;

a threshold switching element having first, second and third terminals the first terminal being coupled to the second terminal of the hot restart capacitor, and the third terminal being coupled to the second hot restart inductive element such that the hot restart capacitor, the threshold switching element and the second hot restart inductive element form a first circuit loop;

a diac coupled to the second terminal of the threshold switching element; and an inductive bias element which is inductively coupled to the resonant inductive element.

18. The ballast circuit according to claim 17, wherein the hot restart circuit further includes a diac capacitor and a diac diode, such that a second circuit loop includes the bias element, the diac diode and the diac capacitor.

19. The ballast circuit according to claim 18, wherein a signal through the resonant inductive element induces a corresponding signal in the bias element which is rectified by the diac diode so as to charge the diac capacitor, such that the diac transitions to a conductive state when a voltage on the diac capacitor increases above a first predetermined threshold.

20. The ballast circuit according to claim 17, wherein the hot restart circuit further includes a hot restart diode coupled to the hot restart capacitor such that a third circuit loop includes the bias element, the hot restart diode and the threshold switching element.

21. The ballast circuit according to claim 20, wherein a signal through the resonant inductive element induces a corresponding signal on the bias element which is rectified by the hot restart diode so as to charge the hot restart capacitor.

22. The ballast circuit according to claim 15, wherein a transition of the threshold switching element to a conductive state generates a parallel LC resonance between the hot restart capacitor and the second hot restart inductive element, which induces a corresponding voltage in the first hot restart inductive element for hot restart of the lamp.

23. A ballast for energizing a HID lamp, comprising:

an inverter circuit having two switching elements for providing an AC drive signal to the lamp;

a resonant inductive element coupled between said switching elements and the lamp;

first and second inductively coupled inductors, said second inductor being directly connected to the lamp at an end thereof;

a first capacitor coupled to the second inductor; and a switching element coupled to the first capacitor such that a first circuit loop includes the switching element, the first capacitor and the second inductor, wherein a transition of the switching element to a conductive state generates a parallel LC resonance between the first capacitor and the second indicator which induces a corresponding voltage at the first inductive element for hot restart of the lamp.

* * * * *